June 18, 1940.                W. F. HIESERMANN                2,205,038
                              IRRIGATION BORDER FILLER
                              Filed Jan. 9, 1940              2 Sheets-Sheet 1
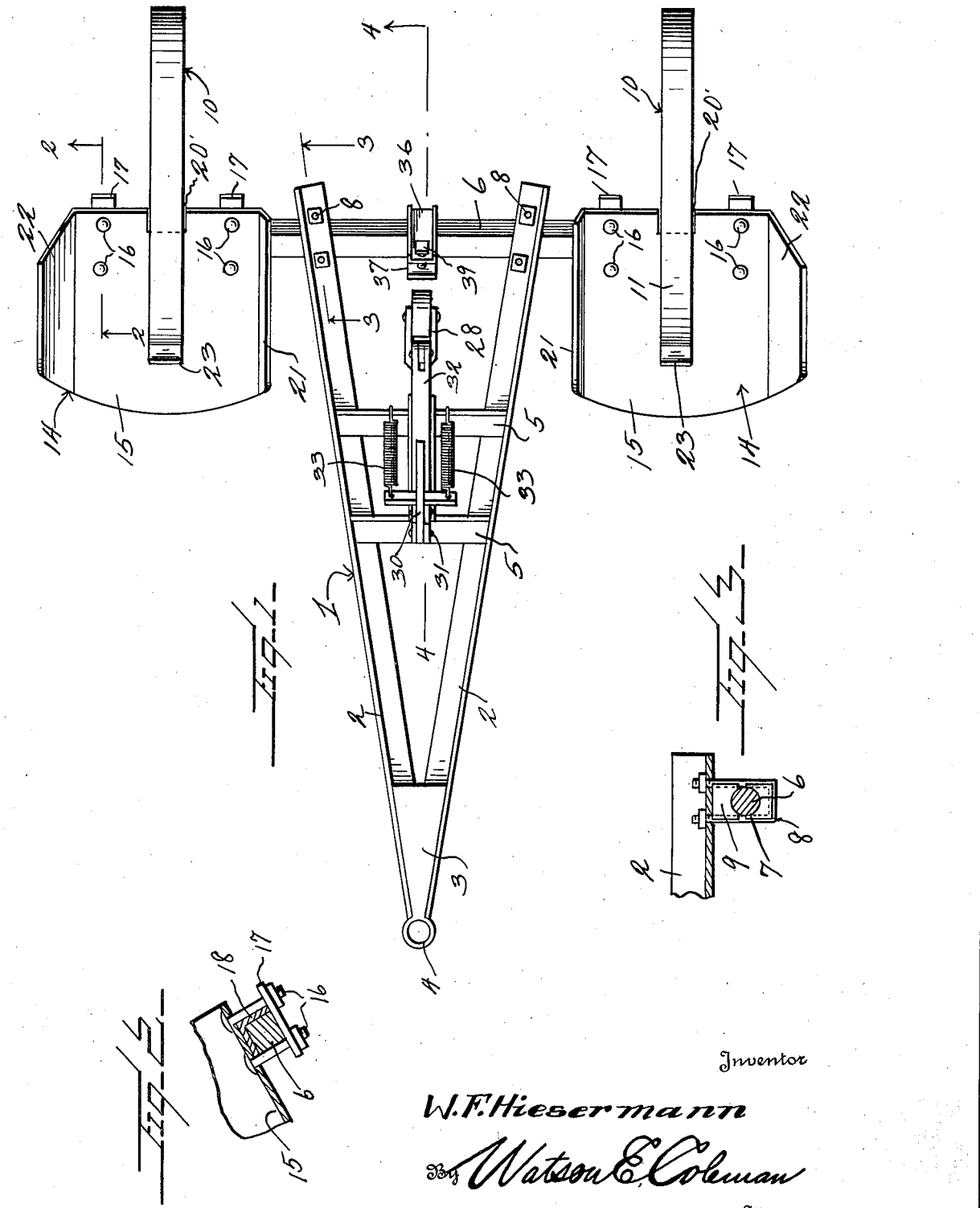
Inventor
W. F. Hiesermann
By Watson E. Coleman
    Attorney

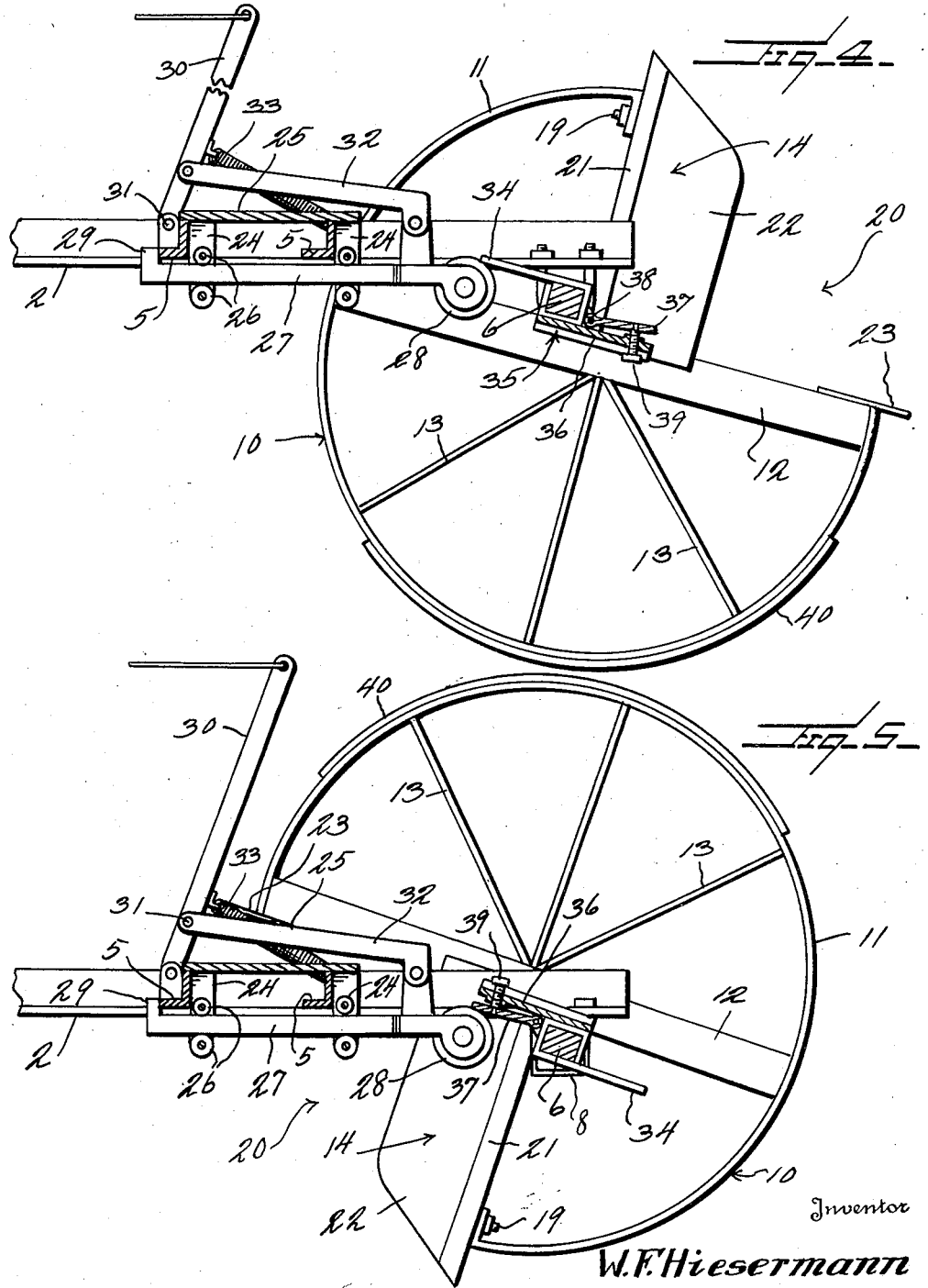

Patented June 18, 1940

2,205,038

UNITED STATES PATENT OFFICE 2,205,038

IRRIGATION BORDER FILLER

William F. Hiesermann, San Juan, Tex.

Application January 9, 1940, Serial No. 313,123

9 Claims. (Cl. 97—55)

This invention relates to improvements in machines used in the formation of borders for irrigated lands and pertains particularly to a filling machine for closing the gaps formed by the irrigation machine at the junction of check borders with borders.

In the sections of the country where agricultural lands must be irrigated and particularly in those sections where irrigation is carried out by flooding the land, it is necessary to build earthen borders for controlling the irrigation water and if such irrigated land has any slope to it, it is necessary to build check borders. The borders and check borders are built by means of a border machine which is in the form of a disk set to throw up a high furrow or border of earth. As a result of the manner in which the border machine operates, after the borders have been built across or along sides of a field and the machine is brought back for the purpose of building the check borders which extend at right angles to the first or main borders, such first borders are naturally torn up at the place where the check border extends across it and as a result, it is necessary that the opening formed in the main border by the machine in passing across during the formation of the check border, must be filled up either by hand or by the use of some machine.

The present invention has for its primary object to provide a novel type of machine which is designed to follow the border disk and to automatically fill up or connect the ends of the first borders with the check borders so as to thus eliminate the necessity for hand labor to perform this job.

A further and more specific object of the present invention is to provide a novel border filling machine, comprising a pair of shovels which are so supported upon a carrying structure that they may be easily controlled to be maintained in an inoperative position up to or just prior to the formation of the cross cut in a border during the formation of a check border, whereupon they may be released to move into an earth scooping position where they will pick up a quantity of earth and discharge the same at the ends of the first border to connect the same with the check border, the shovels automatically dumping and stepping across the first border following the dumping operation so that the desired amount of earth fill will be placed in the proper position for connecting the ends of the border with the check border.

A further object of the invention is to provide in a machine of the character stated, a novel shovel supporting means which functions as a sliding support or skid for the shovel when the latter is in either its idle or its working position and as a turning wheel during the period when the shovel is being dumped or moved into working position, the wheel being provided with a step gap whereby it will pass over the fill supplied by the shovel to the border to leave the border intact and to bring the shovel around into a non-working position where it may be held until again wanted for use.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in top plan of the machine embodying the present invention, showing the shovels in a position intermediate between their non-working or idle positions and their working positions whereby substantially a plan view is had of the shovels.

Fig. 2 is a sectional view on the line 2—2 of Fig. 1.

Fig. 3 is a sectional view on the line 3—3 of Fig. 1.

Fig. 4 is a sectional view taken substantially on the line 4—4 of Fig. 1, but showing the shovels in their raised or non-working position.

Fig. 5 is a sectional view taken substantially on the same line on Fig. 1 as Fig. 4, but showing the shovels in their lowered or working positions.

Referring now more particularly to the drawings, the numeral 1 generally designates a frame which is here illustrated as consisting of the two beams 2 connected at their forward ends by a block 3 which terminates in a hitch ring 4. From the block 3 the frame beams extend rearwardly in divergent relation and are braced intermediate their ends by the cross braces 5.

Extending transversely of the rear ends of the frame beams 2 is an axle 6 which is of polygonal cross-section, as shown in Fig. 2, but which has two areas of circular cross section, as indicated at 7, Fig. 3, which areas lie within the confines of the U-bolt 8 and are rotatably supported between the rounded surfaces of the pair of bearing blocks 9 which are also held between the sides and yoke portions of the U-bolt, as shown in Fig. 3, the ends of the U-bolt passing upwardly through the overlying beam 2.

Upon each outer end of the axle 6 there is mounted a broken wheel 10 which consists of a felly 11 which defines substantially three-quarters of a circle, and a beam 12 which extends transversely of the axle and has one end secured to an end of the felly while the other end is secured to the felly at a diametrically opposite point. This beam 12 constitutes two spokes for the wheel and in addition, there are provided the lighter spokes 13 which extend from the transverse center of the beam 12 radially to the felly, as shown.

Forming an integral part of each broken wheel is a shovel which is indicated generally by the numeral 14, and which comprises a relatively broad plate 15 which is secured across its top edge to the adjacent end of the axle 6 by means of the bolts 16 which pass through clamp plates 17 which extend transversely of the axle, as shown in Fig. 2. While the shovel plates 15 may be secured directly against a side of the axle, it is preferred that there be provided the angle bar 18 in which the axle 6 rests, with one flange of the angle bar extending across and secured to the wheel beam 12 and the other flange extending along the back of the adjacent shovel plate 15 between the same and the axle. This arrangement of the angle bar 18 with respect to the axle and shovel plate is shown in Fig. 2. The angle bar 18 may be welded or otherwise suitably secured to the wheel beam 12 and by this means a firm connection established between the wheel and the axle 6. The other end of the broken wheel felly or annulus 11 is secured, as indicated at 19, to the back of the adjacent shovel plate 15 by a bolt or other suitable means, as shown, thus making it possible to remove the shovel plate for replacement or repair as may be necessary.

Each of the shovel plates extends radially of a wheel, as shown, and between each plate and the remote end of the felly which is attached to an end of the wheel beam 12, is an open area 20 which constitutes substantially one-quarter of the wheel circumference and provides a means for stepping the wheel over a border mound of earth when the shovel of the wheel is released for dumping in the manner hereinafter described.

Each of the shovels has its inner edge provided with a notch 29' in which is positioned the adjacent wheel beam 12. This serves to give additional strength to the structure as it checks any tendency of the shovel to move longitudinally of the supporting axle.

The inner radial edge of each shovel plate 15 is provided with a forwardly turned relatively narrow wing 21 while the outer radial edge of each shovel is bordered by a relatively wide forwardly and laterally extending wing 22.

Secured to each wheel beam 12 at that end of the same which is secured to the end of the broken felly annulus remote from the adjacent shovel, is an outwardly or radially extending ground engaging toe 23 which digs into the earth after the shovels have been released for dumping, so as to hold the wheels and cause them to roll over to lift the shovel away from the earth border instead of dragging it across the same as might be done if frictional contact of the wheel fellys were depended upon to give the desired rotary movement to the wheels in the operation of the machine.

Secured to and extending downwardly from each of the frame braces 5, upon the longitudinal center of the frame, is a pair of guide ears 24. The upper ends of these ears are connected together by the longitudinally extending bar 25 which is disposed transversely of the brace bars 5. Each pair of ears 24 supports in vertically spaced relation two roller members 26 which are mounted to turn upon horizontal axes and extending between these two pairs of rollers and longitudinally of the frame is a longitudinally shiftable trip bar 27 upon the rear end of which is supported for turning on a horizontal axis, a trip roller 28. The forward end of the trip bar has the upwardly extending stop finger 29 which engages the forward side of the cross bar 5 for limited rearward movement.

The numeral 30 designates a control lever, the lower end of which is suitably pivotally supported as at 31, upon the forward bar 5 and pivotally coupling the lower end of this lever with the rear end of the trip bar 27 is a link 32. Springs 33 disposed upon opposite sides of the link 32, connect the lever 30 with the rear brace bar 5 and normally urge the lever 30 to swing backwardly and thus force the trip roller rearwardly toward the axle 6. The trip bar lies substantially in the same vertical plane as the axle and cooperates with two trip fingers which are secured to the axle, for the purpose of holding the wheel shovels in raised inoperative positions and in lowered scraping or earth digging positions. One of these trip fingers is indicated by the numeral 34 and comprises merely a single tongue or strip of metal secured to one side of the axle to extend in one direction therefrom and transversely thereof. This trip finger when brought around into engagement with the upper side of the trip roller, secures the broken or segmental wheels in a position where the shovels are substantially vertically disposed as illustrated in Fig. 4. The other trip finger is indicated generally by the numeral 35 and comprises a fixed member 36 which is secured to the axle upon the opposite side thereof from the finger 34, to extend in the opposite direction from the finger 34 and transversely of the axle, and an adjustable element 37 which is arranged to extend longitudinally of the fixed member 36 and is pivotally supported at its inner end, as at 38, so as to have relative movement at its outer end with respect to the fixed portion 36. This adjustable element of the trip finger 35 is held in adjusted position by a set screw 39 which is threaded through the outer end portion of the fixed element 36 and has its other end loosely coupled with the adjustable element 37. This adjustable element 37 is arranged to be engaged by the trip roller 28 so as to hold the shovels in downwardly directed working position as shown in Fig. 5, and the extent to which the shovels dig up the earth is controlled by the adjustment of the element 37. It will be readily apparent that when this element is moved inwardly to substantially parallel relation with the fixed element 36, the shovels will be permitted to come more nearly to a vertical position with the outer edges in contact with the earth and thus dig up the maximum amount of earth whereas if the adjustable element 37 is disposed at the maximum distance away from the fixed element 36, it will be seen that the shovels will be directed toward the earth at more of an oblique angle and thus will not dig up such a large quantity of earth.

When the shovels are held in their inoperative positions as shown in Fig. 4, the wheel tread or felly will function as a skid, therefore, the portion of the felly opposite the inner end of the shovel will be subjected to more wear than the other part of the same, and for this reason there is provided an auxiliary tread strip 40 which is secured along a portion of the outer face of the main tread or felly 11.

As previously stated, the present border filler machine is designed to be drawn along behind the border forming disk and, therefore, in operation, this machine will be drawn over or caused to slide along the surface of the ground between the main borders, while the check borders are being built up. The trip roller will thus have the trip finger 34 engaged with it to hold the wheels in the position shown in Fig. 4, where the shovels are raised. When the border disk passes through a previously formed border and thus cuts away a part of such previously formed border at the two sides of the check border, or at some suitable time just prior to this operation of the border disk machine, the operator pulls the lever 30 so as to disengage the roller 28 from the trip finger 34, thus permitting the broken wheels to turn to swing the shovels forwardly and downwardly so as to bring their outer edges into contact with the earth. The edges of the shovels will then dig into the earth and scoop up a quantity of the same and carry this along toward the opening formed in the border by the preceding disks. As the shovels reach the openings of the border, pushing along a quantity of earth before them, the trip roller 28 will be engaged with the adjustable trip finger 35 and the operator then pulls forward upon the lever 30 so as to withdraw the trip roller 28 from the finger 35, thus permitting the finger to pass the roller and the wheels and shovels to turn over. The earth carried by the shovels will be discharged or dumped into the openings in the border and since the edges of the shovels are still in engagement with the ground, they will tend to hold their position, thus causing the wheels to continue turning and to step over the filled in areas of the border. This will bring the earth engaging toes 23 of the wheels into contact with the ground at the opposite side of the border from the shovels and as these toes dig in, they will cause the wheels to continue to turn and thus lift the shovels over the filled part of the border. The wheels will continue to turn until the trip finger 34 again moves around to the position where it contacts the top of the roller 28 and the machine will be held in this position until it is again to be used in the manner described.

It will be noted that the axle 6 is eccentrically located with respect to the wheel and that it is disposed upon the side of the wheel center remote from the toe 23, but it is upon the side of the wheel center nearest to the edge of the shovel. Because of this disposition of the wheel on the axle, it will be readily seen that after the trip finger 36 has been released so as to permit the shovels to turn over and release their loads, and the toes 23 have engaged in the ground, the shovels will move upwardly from the ground at a sharper rate or more quickly because of the eccentric positioning of the axle with respect to the wheels than would be the case if the axle were at the center of the wheels. For this reason, the shovels will not be dragged across the pile of newly dumped earth but will leave it properly stacked.

From the foregoing, it will be apparent that there has been provided in the machine herein disclosed, a novel and relatively simple mechanism by means of which the openings formed in borders, in the process of forming check borders, may be easily and properly filled in or closed immediately following the formation of the check border across the first formed or main border and without the employment of manual labor.

What we claim is:

1. An irrigation border filler, comprising a draft frame, an axle extending transversely of the frame and rotatably coupled therewith, a pair of broken wheels supported upon said axle at opposite sides of the frame to turn with the axle, each of said wheels including a tread defining a portion of an annulus whereby each wheel has a radially opening portion adapted to straddle an earth border, a shovel secured to each annulus and extending radially of the wheel at one side of said opening, a pair of trip fingers carried by the axle to rotate therewith, and control means carried by the frame and shiftable thereon for selective engagement with said fingers to maintain said wheels against turning with the shovels in inoperative position and to maintain the wheels against turning with the shovels in ground engaging operative position as desired.

2. An irrigation border filler, comprising an elongated draft frame, an axle rotatably connected with and extending transversely of an end of the frame, means at the opposite end of the frame for attaching a draft machine, a broken wheel connected with the axle at each side of the frame to turn with the axle, each of said wheels having a radially opening segmental portion, a shovel blade integral with each wheel and extending radially thereof at one side of the segmental opening of the same, each shovel blade having an earth engaging edge disposed outwardly of the circumferential area defined by the wheel, said blades having an operative position in which the said edges are directed downwardly toward and engage the earth, releasable trip means for maintaining said shovel blades in said operative position, and releasable trip means for maintaining said shovel blades in an inoperative position where the said edges thereof are raised from the ground.

3. An irrigation border filler, comprising an elongated draft frame, an axle rotatably connected with and extending transversely of an end of the frame, means at the opposite end of the frame for attaching a draft machine, a broken wheel connected with the axle at each side of the frame to turn with the axle, each of said wheels having a radially opening segmental portion, a shovel blade integral with each wheel and extending radially thereof at one side of the segmental opening of the same, each shovel blade having an earth engaging edge disposed outwardly of the circumferential area defined by the wheel, said blades having an operative position in which the said edges are directed downwardly toward and engage the earth, releasable trip means for maintaining said shovel blades in said operative position, releasable trip means for maintaining said shovel blades in an inoperative position where the said edges thereof are raised from the ground, and a ground engaging element carried by each wheel and extending radially thereof at the opposite side of said open segmental portion from the shovel blade.

4. An irrigation border filler, comprising an elongated body frame having a draft coupling means at one end, an axle extending transversely of the other end of said frame, a rotatably supported broken wheel at each end of said axle, each of said wheels having a radially opening segmental portion, an earth shovel connected with each wheel and extending radially thereof at one side of said open portion, each shovel having an outer earth engaging edge, a pair of trip members operatively coupled with said wheels to rotate therewith, a shiftable control carried by the frame and adapted for selective connection with said trip members, said control when operatively coupled with one of said trip members maintaining said wheels against rotation and said shovels in raised position with respect to the ground, said control when operatively coupled with the other one of said trip members maintaining said wheels against rotation with said shovels disposed in position for contact of their outer edges with the ground, and means carried by each of said wheels at the opposite side of the open area thereof from the shovel for engagement in the ground to effect turning of the wheels after the release of the said other member by the control means.

5. An irrigation border filler, comprising an elongated frame having draft means at one end, an axle extending transversely of the other end of the frame and rotatably supported thereon, a broken wheel secured to each end of the axle for rotation therewith and having a radially opening segmental section, a shovel carried by each wheel and extending radially thereof from adjacent the center of the same and disposed at one side of the radially opening segment, each of said shovels having a forward ground engaging edge, a wing extending lengthwise of the outer side of each shovel, a pair of trip fingers carried by the axle and extending in opposite directions thereon, a trip bar supported upon the frame for reciprocable movement longitudinally thereof, and adapted for selective engagement with said fingers, said wheels being held against rotation with the shovels raised from contact with the ground when one of said trip fingers is engaged by said bar, said wheels being held against rotation and said shovels being maintained with the said forward edges thereof in ground engaging position when the other one of the trip fingers is engaged by the bar, and means for effecting reciprocatory movement of the trip bar.

6. An irrigation border filler, comprising an elongated frame having draft means at one end, an axle extending transversely of the other end of the frame and rotatably supported thereon, a broken wheel secured to each end of the axle for rotation therewith and having a radially opening segmental section, a shovel carried by each wheel and extending radially thereof from adjacent the center of the same and disposed at one side of the radially opening segment, each of said shovels having a forward ground engaging edge, a wing extending lengthwise of the outer side of each shovel, a pair of trip fingers carried by the axle and extending in opposite directions thereon, a trip bar supported upon the frame for reciprocable movement longitudinally thereof, and adapted for selective engagement with said fingers, said wheels being held against rotation with the shovels raised from contact with the ground when one of said trip fingers is engaged by said bar, said wheels being held against rotation and said shovels being maintained with the said forward edges thereof in ground engaging position when the other one of the trip fingers is engaged by the bar, means for effecting reciprocatory movement of the trip bar, and means forming a part of the said other one of the trip fingers and engaged by the trip bar for controlling the angular disposition of the shovels with respect to the ground.

7. An irrigation border filler, comprising a pair of whels each having a tread formed to define less than a complete circle whereby each wheel has a radially and peripherally opening segmental area, an axle common to and supporting said wheels for unitary rotation, a draft frame coupled with said axle between the wheels, a shovel blade secured to each end of the axle and extending radially of the adjacent wheel along one side of the segmental area thereof, each blade having a forward edge for engagement with the ground, wings extending along the side edges of each shovel blade, a ground engaging toe extending radially of each wheel at the opposite side of the segmental area from the adjacent shovel, a pair of trip fingers secured to the axle and extending in opposite directions, a trip bar supported upon the frame for reciprocation relative to the axle and in the vertical plane of said fingers, a roller carried at the rear end of said bar for selective contact by said fingers, said wheels being held against rotation when the fingers are in contact with said roller, one of said fingers contacting the roller to hold said shovel blades in raised position with respect to the ground, the other of the fingers contacting the roller to hold the shovel blades in position for engagement of the forward edges thereof with the ground, and means for reciprocating said bar.

8. An irrigation border filler, comprising a pair of wheels each having a tread formed to define less than a complete circle whereby each wheel has a radially and peripherally opening segmental area, an axle common to and supporting said wheels for unitary rotation, a draft frame coupled with said axle between the wheels, a shovel blade secured to each end of the axle and extending radially of the adjacent wheel along one side of the segmental area thereof, each blade having a forward edge for engagement with the ground, wings extending along the side edges of each shovel blade, a ground engaging toe extending radially of each wheel at the opposite side of the segmental area from the adjacent shovel, a pair of trip fingers secured to the axle and extending in opposite directions, a trip bar supported upon the frame for reciprocation relative to the axle and in the vertical plane of said fingers, a roller carried at the rear end of said bar for selective contact by said fingers, said wheels being held against rotation when the fingers are in contact with said roller, one of said fingers contacting the roller to hold said shovel blades in position for engagement of the forward edges thereof with the ground, means for reciprocating said bar, and the said other one of the fingers comprising a fixed member and a movable member, the said movable member being adjustable with respect to the fixed member and contacting said roller and functioning to regulate the angular relation of the shovel to the ground.

9. An irrigation border filler, comprising a draft frame, an axle extending transversely of the frame and rotatably coupled therewith, a pair of broken wheels supported upon said axle at opposite sides of the frame to turn with the axle, each of said wheels including a tread defining a portion of an annulus whereby each wheel has a radially opening portion adapted to straddle an earth border, a shovel secured to each annulus and extending radially of the wheel at one side of said opening, a pair of trip fingers carried by the axle to rotate therewith, and control means carried by the frame and shiftable thereon for selective engagement with said fingers to maintain said wheels against turning with the shovels in inoperative position and to maintain the wheels against turning with the shovels in ground engaging operative position as desired, the said axle being disposed eccentrically of said wheels and in respect to the wheel opening in a manner to effect a sharp upward movement of the shovel from the ground after the wheels are released for turning to effect dumping of the shovels.

WILLIAM F. HIESERMANN.